Patented Nov. 12, 1935

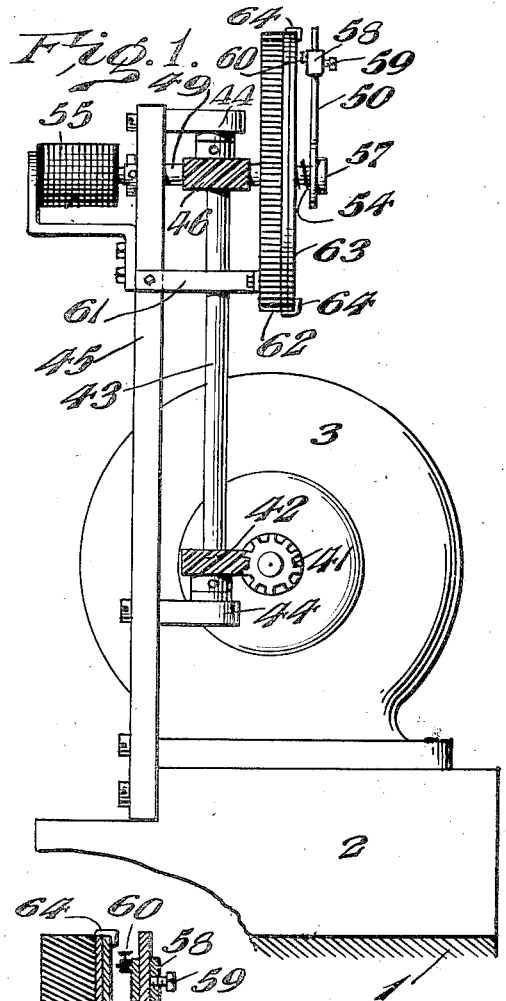
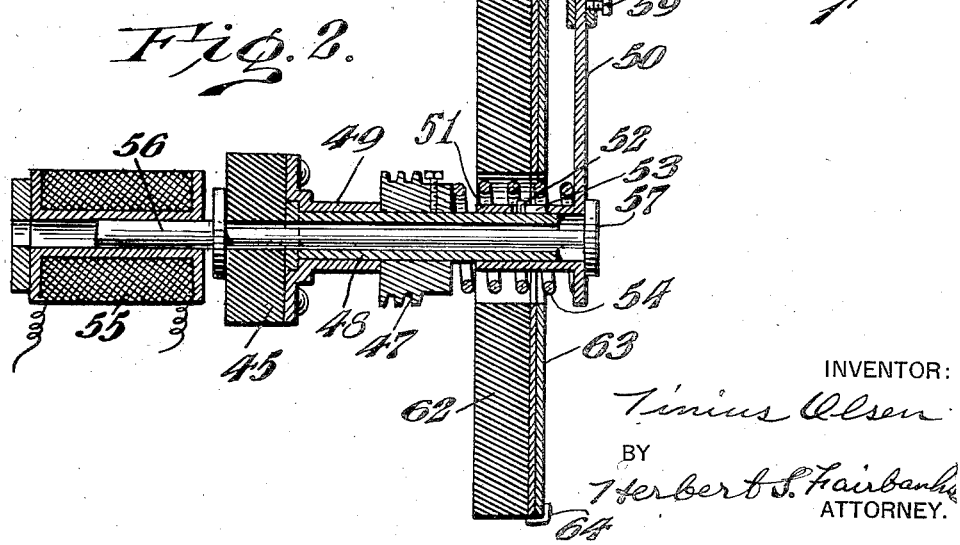

2,020,372

UNITED STATES PATENT OFFICE 2,020,372

RECORDING DEVICE

Tinius Olsen, Philadelphia, Pa.; Thorsten Y. Olsen and Provident Trust Co. of Philadelphia, administrators of said Tinius Olsen, deceased Application December 3, 1927, Serial No. 237,498

2 Claims. (Cl. 234—1)

In a copending application for a novel method of and apparatus for balancing rotatable bodies, Serial No. 209,492 filed July 30th, 1927, patented May 14, 1933, #1,860,257, in the name of Jacob Lundgren, there is described and broadly claimed a novel apparatus for balancing wherein the angle of unbalance in a specimen is electrically determined.

With the above in view, my invention comprehends a novel apparatus for electromagnetically indicating and recording the angle of unbalance in a rotatable specimen.

It further comprehends a novel construction and arrangement of an angle indicator and recorder.

It further comprehends novel means for revolving an indicating and recording member in unison with the revolution of the specimen under test and effecting the indicating and recording movement of such member by electro-magnetic means controlled by centrifugal action on an unbalanced mass or unbalanced masses in the specimen under test as disclosed in the Lundgren Patent #1,860,257, the machine being provided with a compensator for each axial plane of the specimen in which the unbalance is to be determined.

For the purpose of illustrating the invention, I have shown in the accompanying drawing a typical embodiment of it, which, in practice, will give satisfactory and reliable results. It is however, to be understood that the various instrumentalities of which my invention consists can be variously arranged and organized, and my invention is not limited to the exact arrangement and organization of these instrumentalities, as herein set forth.

Figure 1 is an elevational view of the invention.

Figure 2 is a vertical section of a portion of Figure 1.

Similar numerals of reference indicate corresponding parts.

Referring to the drawing:—

The machine is provided with a base or supporting foundation 1, which in practice may be of any desired character. As illustrated, it is in the form of a casting having at one end a raised portion 2 which forms a support for an electric motor 3 controlled in the usual or conventional manner. The motor effects the revolution of the specimen and the motor drive is connected with a pointer to drive it at a definite speed relationship with the speed of revolution of the specimen.

The shaft of the motor 3 is provided with a gear 41 which meshes with a gear 42, mounted on a shaft 43, journalled in brackets 44, carried by a standard 45 which is fixed at its lower end to the motor support 2.

The shaft 43 is provided at its upper end with a gear 46 which meshes with the gear 47, fixed to a tubular shaft 48, which is journalled in a bearing 49, carried by the standard 45.

The shaft 48 carries an indicating and recording finger 50 which is provided with a sleeve 51 loosely mounted on the shaft 48 by means of a pin and slot connection or its equivalent, the shaft, as illustrated, being provided with a pin 52 which extends through a slot 53 in the sleeve 51. A spring 54 is interposed between the gear 47 and the finger 50 so that the tendency of such spring is to move the finger 50 outwardly.

The standard 45 has secured to it in any desired manner an electro-magnet 55 which is provided with an armature 56 which at its outer end is provided with a head 57 which bears against the outer face of the finger 50. The finger 50 which forms an indicating and recording element or member has adjustably mounted on it a carrier 58 by means of a set screw 59. This carrier is provided with a stylus 60 of any desired or conventional character such as is employed in conjunction with automatic indicators and recorders.

The standard 45 has secured to it by means of a bracket 61, a dial holder 62 in the form of a disc, to the front face of which is detachably connected in any desired manner a dial 63. As illustrated this dial is secured in position by means of clips 64.

The operation of the recording device is as follows:—

If the operator closes the circuit through the electro-magnet 55 thereby energizing such magnet the armature 56 will be moved inwardly against the tension of the spring 54 so that the stylus 60 will contact with the graduated dial 63 at a position corresponding to the angle of unbalance in the specimen.

After the operator opens the circuit it will be apparent that the spring 54 will cause the revoluble arm 50 which carries the stylus to be moved outwardly out of engagement with the dial.

It will thus be clear that the finger 50 will momentarily contact with the dial and indicate thereon the angle corresponding to the angle of unbalance in the specimen and the recorded dot or mark made by the stylus 60 will make a visible record of the angle of unbalance.

Having thus described my invention what I claim as new and desire to secure by Letters Patent, is:—

1. A recording device comprising a record receiving dial, a rotatable tubular shaft extended axially through the dial, a sleeve mounted on said shaft protruding beyond the face of the dial, a finger mounted on said sleeve and terminally provided with a stylus, connections between the shaft and sleeve to permit axial movement of the latter over the former and rotating the finger over the dial, a compression spring surrounding the sleeve to urge the finger and stylus away from the dial, an electro-magnet axially aligned with the shaft and positioned at the end thereof remote from the finger, and an armature for the magnet and operatively connected with the sleeve to move the stylus to mark the dial against the pressure of said spring.

2. A recording device comprising a record receiving dial, a rotatable tubular shaft extended axially through the dial, a sleeve mounted on said shaft protruding beyond the face of the dial, a finger mounted on said sleeve and terminally provided with a stylus, connections between the shaft and sleeve to permit axial movement of the latter over the former and rotating the finger over the dial, means for normally urging the stylus carrying sleeve away from said dial, and means for moving said stylus toward the dial to effect recording against the urging of said first named means.

TINIUS OLSEN.